Feb. 19, 1963 | I. E. COX | Re. 25,330

BEARINGS

Original Filed Oct. 11, 1960 | 7 Sheets-Sheet 1

Inventor
Isaac E. Cox

Inventor
Isaac E. Cox

BEARINGS
Original Filed Oct. 11, 1960 7 Sheets-Sheet 3
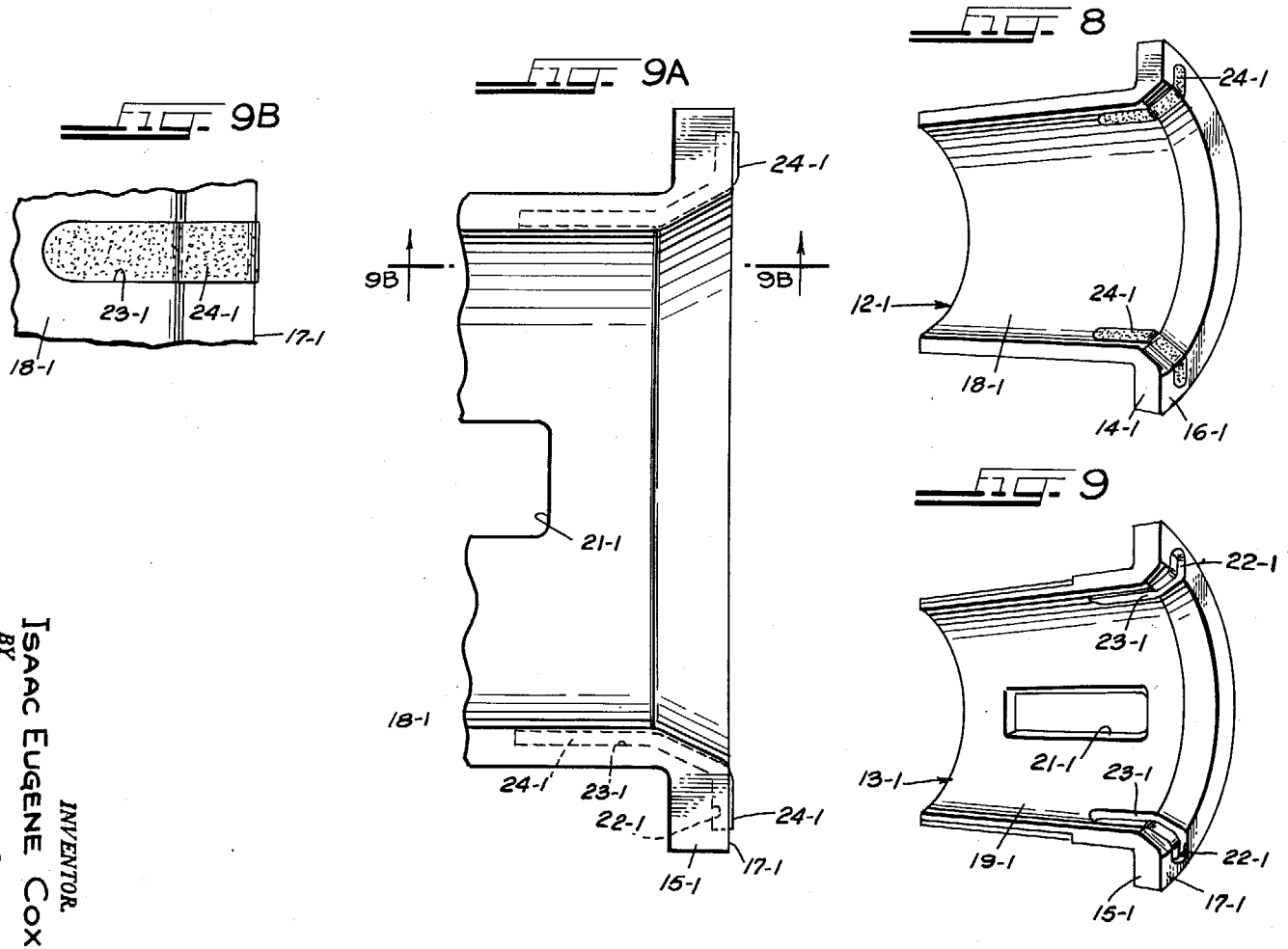
INVENTOR.
ISAAC EUGENE COX
BY
Wallace and Cannon
ATTYS.

INVENTOR.
ISAAC EUGENE COX
BY
Wallace and Cannon
ATTYS.

BEARINGS
Original Filed Oct. 11, 1960 7 Sheets-Sheet 5
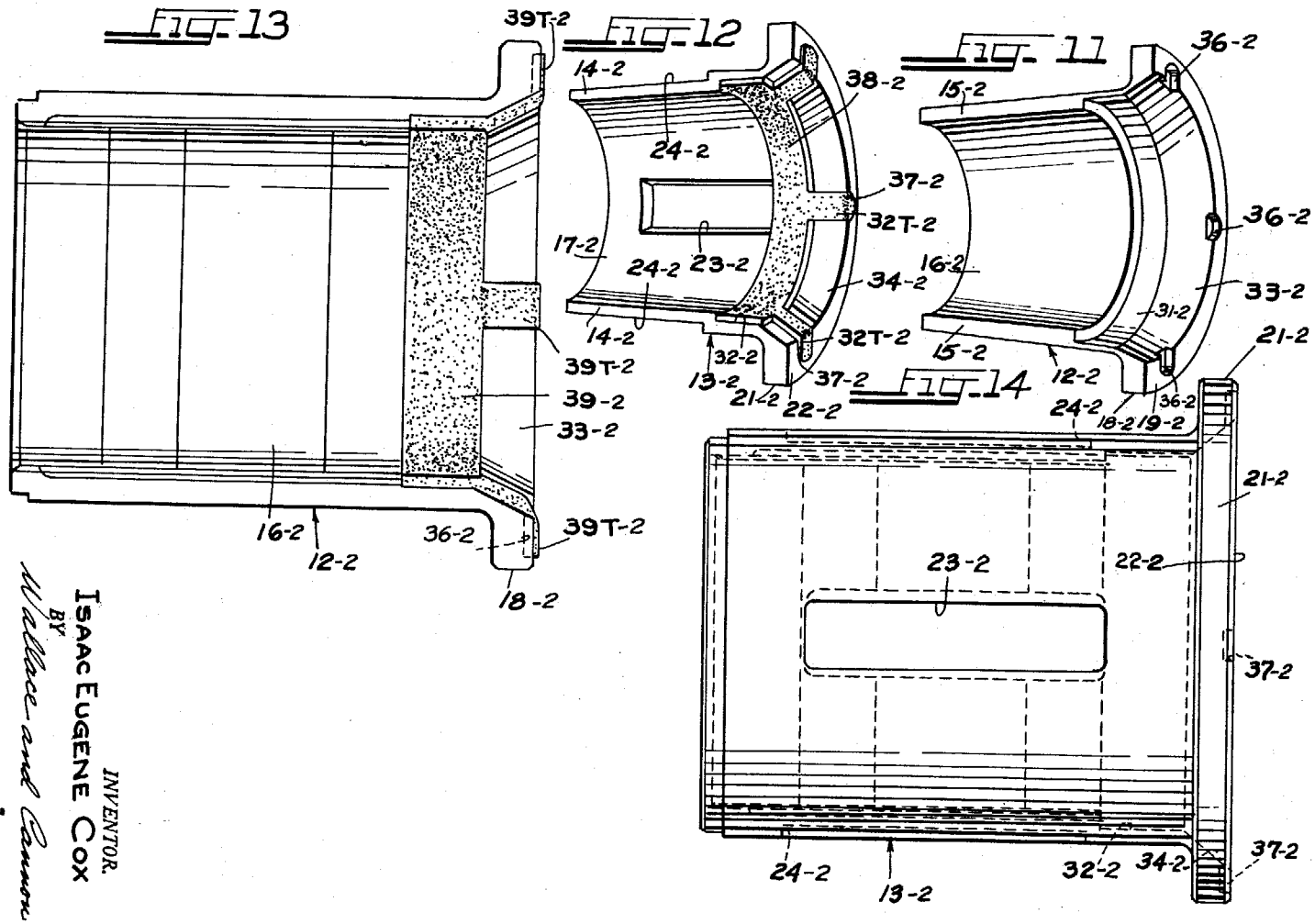
INVENTOR.
ISAAC EUGENE COX
BY
Wallace and Cannon
Attys.

INVENTOR.
ISAAC EUGENE COX
BY
Wallace and Cannon
ATTYS.

INVENTOR.
ISAAC EUGENE COX
BY
Wallace, Kenyon and Dorn
ATTYS.

United States Patent Office

Re. 25,330
Reissued Feb. 19, 1963

25,330
BEARINGS

Isaac Eugene Cox, St. Louis, Mo., assignor to American Brake Shoe Company, New York, N.Y., a corporation of Delaware Original No. 2,997,343, dated Aug. 22, 1961, Ser. No. 62,317, Oct. 11, 1960. Application for reissue Aug. 21, 1962, Ser. No. 218,810
8 Claims. (Cl. 308—88)

Matter enclosed in heavy brackets [ ] appears in the original patent but forms no part of this reissue specification; matter printed in italics indicates the additions made by reissue.

This invention relates to bearings and in particular to bearings of different forms and shapes which have a thrust face requiring lubrication for effective operation. This application is a continuation-in-part of application Serial No. 849,957, filed October 30, 1959 which in turn was a continuation-in-part of application Serial No. 814,183, filed May 19, 1959, now abandoned.

One of the more well-known forms of bearings having a thrust face is the bearing associated with the journal of a railroad car axle. Such axles are formed with a journal portion of reduced diameter having a collar of enlarged diameter at the outer end thereon, and are also formed with a so-called dust guard seat just axially outward of the portion of the axle where the car wheel is mounted. Conventionally, the journal is supported in part on a segmental bearing, but it has also been proposed to associate a 360° or so-called sleeve-type bearing with the journal of a railroad car axle. In any event, such bearings, whether of one-piece 360° or segmental form, have end surfaces in the nature of thrust faces that are respectively engageable with the inner radial surface of the journal collar and the fillet surface where the journal meets the dust guard seat. As a matter of fact, the bearing is of less axial dimension than the spacing between the aforesaid inner radial face and fillet surface in order to allow for so-called lateral play of the car axle with respect to its bearing.

Thus, it will be seen that the thrust surfaces or faces of the car bearing are engageable by the collar of the journal or the fillet surface adjacent to the dust guard seat, and hence it is of utmost importance that lubricant be furnished to these faces in order that there will not be bearing seizure or failure which is one of the most severe hazards associated with railroad cars.

Arrangements that have been heretofore proposed for enabling the thrust face of such a bearing to be lubricated have generally been quite complicated, and in many instances the arrangements do not afford a copious supply of lubricant at the instant of engagement between the thrust surface of the bearing and the complemental surface of the rotating part as will be discussed in more detail hereinafter. In view of this, the primary object of the present invention is to enable lubricant in large quantities to be furnished to the thrust surface of a bearing at the instant of engagement by the complementary surface of the rotating part associated with such bearing, and to accomplish this by forcing, in a novel manner, large quantities of lubricant into a wick of felt or the like in effect having an end extended to the thrust face of the bearing.

Specifically, it is an object of the present invention to accomplish such lubrication by having resort to a strip or the like of oil absorbent material extended axially of the bore or arcuate inner face of the bearing, which strip is so arranged as to be free of the journal or axle or equivalent rotating part but which has an end portion communicating with the thrust face of the bearing. Advantageously, the lubricating strip is a felt strip which does not easily bleed, that is, which retains lubricant fed thereto for prolonged periods and hence lubricant is instantly available even for starting conditions. Further, the bearing can be formed with one or more axially extending grooves depending upon whether or not the rotating part is reversible, and in any event, a groove which contains the lubricant strip is located on what will constitute the high pressure lubricant side of an opening in the bore or inner arcuate face of the bearing through which lubricant is to be fed by a primary lubricator to the axle, journal or other rotating element in the bearing bore, and in this manner copious amounts of lubricant fed to the rotating part by the primary lubricator are forced by the rotating part into the strip of lubricant-absorbing material to be available for thrust face lubrication. Thus, the rotating part actually places the lubricant in the bore under pressure which is effective for the length of the bearing bore, and I take advantage of this condition to maintain the lubricator strip highly saturated, particularly at the end of the bearing where there is so-called "end leakage" as I will explain in more detail hereinafter.

Bearings requiring flange or thrust face lubrication are also commonly utilized for supporting axle hung traction motors in railroad locomotives, cranes, shovels and the like. It is conventional practice to mount such motors so that the motor is suspended between a truck frame, or similar structure, and the axle, and split sleeve bearings are commonly utilized with a motor frame for mounting the motor on the axle. The motor drives the axle by a gear that is fixed on the axle, and the split bearing for the axle-hung motor includes portions formed with radially extending thrust faces engageable with a hub face of the driving gear. Thus, the axle in such an arrangement is permitted some longitudinal movement within the bearing to accommodate the relative movement between the trucks and axles necessitated by curves in the track, and the thrust faces of the bearing are effective to limit the extent of such movement.

It is, of course, important that an adequate supply of lubricant be maintained between the respective bearing surfaces of the axle and gear and the bearing for an axle hung motor of whatever form during all phases of operation. One arrangement for effecting such lubrication is that illustrated and described in my Patent Number 2,827,343, issued March 18, 1958, and to which reference may be had for a more detailed description of the manner in which split bearings are incorporated in an axle hung motor application than that briefly reviewed hereinabove.

Lubrication of the axially extending portions of the sleeve bearing has heretofore been proposed to be effected by a felt or similar wick-type lubricator which extends from a reservoir of lubricant through a window opening in the sleeve bearing and directly contacts the axle to spread the lubricant thereon, this being disclosed in my aforesaid patent. That patent also discloses the use of a wick strip lubricator for feeding lubricant to the flange of the bearing. The strip has a tail portion that dips in the oil reservoir, an intermediate portion that is run through a passage in the lower half of the bearing, and an operating end that seats in a pocket in the flange or thrust face of the bearing. I have now found that even more effective lubrication of the thrust face of a bearing for an axle hung motor can be accomplished in comparison to the arrangement of my aforesaid patent by having resort to effective pressure feeding of lubricant into an oil absorbent strip. This involves the end leakage principle referred to above, and such constitutes another object of the present invention.

By reason of the manner in which a traction motor of the foregoing kind is usually suspended between the truck frame and the axle, the load area on an axle bearing shifts approximately 120° about the bearing from one direction of rotation of the axle to the other. The load area also changes with the torque the traction motor is exerting, as contrasted to a practically constant load applied to the journal bearings in railroad freight car journal boxes. This changing area of load should at all times be effectively lubricated to avoid bearing wear or seizure, and it is particularly important that such a load area be lubricated at the start of the rotation of the axle within the bearing. It is therefore another object of this invention to incorporate a strip of oil absorbent material in a collared split bearing of the type described in a manner such as to insure an adequate supply of lubricant to the flange regardless of the shifting load area. The disposition of the oil absorbent material within the bearing is such that lubricant is supplied thereto at various locations about the periphery thereof by a primary lubricator as above described, and is readily transferred to the thrust face as a consequence of the engagement of the thrust face of the bearing with a gear hub or like opposing thrust surface. Thus, the lubricating arrangement of the invention is as effective during initial starting as during any other phase of operation, regardless of the direction of rotation; and another object of this invention is to accomplish such lubrication in a highly efficient and inexpensive manner.

In accordance with this phase of the present invention, a flange-type sleeve bearing is formed in two mating sections and is formed with a plurality of radially extending spaced apart wick-type lubricator receiving pockets in the thrust face of the flange. Each pocket is adapted to receive an end of a lubricating strip, and each strip is arranged to receive a copious supply of lubricant forced thereinto by the rotating part in the bearing in turn furnished with large quantities of lubricant from a primary lubricator in contact with the rotating part. Preferably there is a pocket in each half of the assembled bearing, so that if perchance one of the bearing halves should be axially displaced on the axle or journal relative to the other half, there nevertheless remains another wick effective to contact and lubricate the axle collar or thrust element. Such constitutes another object of the present invention, and a related object is to form the strip receiving grooves along the mating edges of the split bearing halves since this facilitates assembly, enables four wick strips and ends thereof in effect to be easily afforded, and materially saves on production costs.

As a further modification, each section can be formed with an arcuate groove of appreciable axial extent at that end of the axially extending inner bearing surface which is adjacent the radial thrust face of the flange. The arcuate shaped recesses form an annulus at one end of the bearing, and a ring-shaped wick member is mounted within this annulus so as to be disposed slightly beneath the inner, axial bearing surface. The ring-shaped wick member includes tab or strip portions which are seated within thrust face pockets and which strips project slightly outwardly beyond the surface of the thrust face so as to be effective to transmit lubricant stored within the ring-shaped wick member directly to a thrust face of an axle thrust collar whenever the axle moves toward engagement with the radial thrust face of the bearing. It is another object of this invention to incorporate the foregoing arrangement in a sleeve bearing in a novel and efficacious manner.

Other and further objects of the present invention will be apparent from the following description and claims and are illustrated in the accompanying drawings, which, by way of illustration, show preferred embodiments of the present invention and the principles thereof and what is now considered to be the best mode contemplated for applying those principles. Other embodiments of the invention embodying the same or equivalent principles may be used and structural changes may be made as desired by those skilled in the art without departing from the present invention and the purview of the appended claims.

In the drawings:

FIGS. 8 and 9 are perspective views of the two sections of a split bearing for an axle hung motor, said sections being constructed in accordance with the present invention;

FIG. 9A is a fragmentary elevation of the bearing half section illustrated in FIG. 9 but showing the wick strips in place;

FIG. 9B is a fragmentary sectional view taken substantially on the line 9B—9B of FIG. 9A;

FIG. 11 is a perspective view of one half section of another kind of bearing for an axle hung motor constructed in accordance with this invention;

FIG. 12 is a perspective view of the related half section of the bearing adapted to mate with the section illustrated in FIG. 11, and showing a wick member associated therewith;

FIG. 13 is a plan view of the bearing section illustrated in FIG. 11, but showing a wick member associated therewith;

FIG. 14 is a bottom plan view of the bearing section illustrated in FIG. 12, but with the wick member removed;

Figure 1:
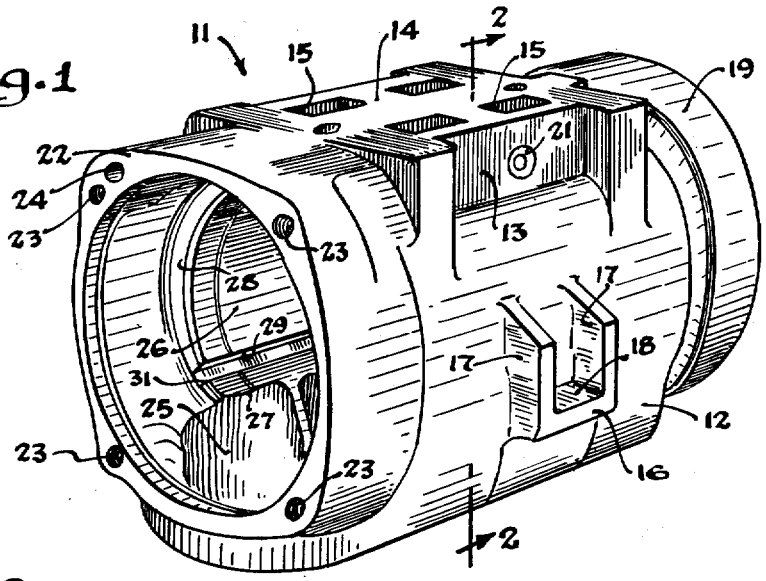
FIG. 1 is a perspective view of an embodiment of a bearing constructed in accordance with this invention.

For the purposes of disclosure one form of the present invention is illustrated as incorporated in a sleeve or so-called cartridge bearing adapted to be used in a railway car journal box. Thus, in FIG. 1 there is illustrated a one-piece 360° cartridge type sleeve bearing 11. The bearing 11 comprises a body member 12 which has formed integrally therewith at the upper exterior surface a raised boss 13 which has a flat surface 14 which provides a seat for a wear plate to be described hereinbelow. A plurality of pockets 15 are formed in the flat surface 14, and of these at least one functions as a dust pocket in a manner hereinafter to be described. The boss 13 is also provided with a recess 21 for receiving a roll pin.

A pair of U-shaped lugs 16 are also formed integrally with the body member 12 on each side of the exterior surface thereof and comprise a pair of vertically extending and outwardly projecting webs 17 interconnected at their lower ends by a horizontally extending web 18. Such lugs 16 adapt the cartridge unit 11 for use in known pedestal side frame applications. At the rearward end of the cartridge unit 11 there is formed an enlarged shroud or collar 19, the interior of which is grooved to receive an annular dust guard seal ring which rides on the dust guard seat of the car axle.

The cartridge unit 11 includes a vertically extending forward face 22 which is provided with a plurality of tapped openings 23 for receiving cap screws which attach a cover plate to the cartridge unit 11. The forward face 22 is also provided with an opening 24 which is the termination of a vent passage formed within the body member 12 and communicating with one of the pockets 15. The opening 24 is positioned to be aligned with a similar vent passage opening in the cover plate.

Figure 6:
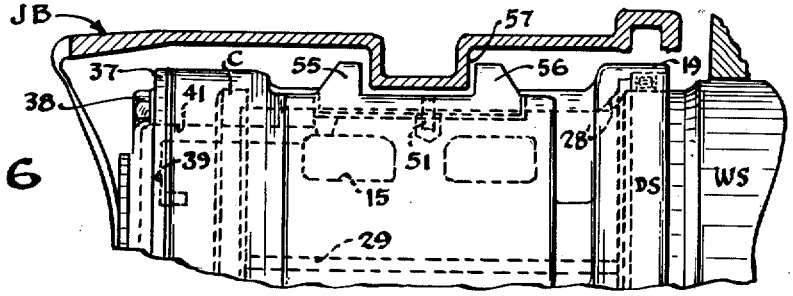
FIG. 6 is a plan view taken in the direction of the arrows 6—6 in FIG. 5.
Figure 5:
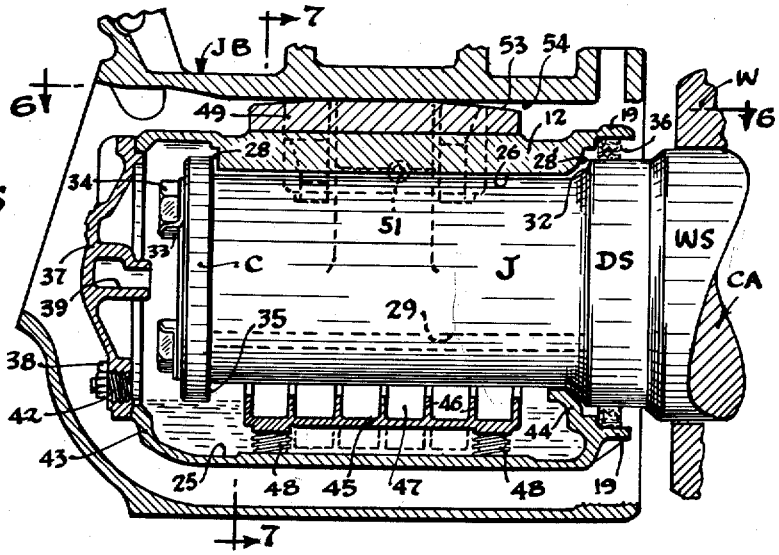
FIG. 5 is a sectional elevation view of the embodiment illustrated in FIG. 1 shown mounted on a journal and received within a journal box.

The lowermost section of the body member 12 provides an internally recessed oil reservoir 25. The body member 12 also includes a rounded inner wall 26 of lesser axial extent than that of the complete body and this inner wall provides the main bearing surface of the journal. The body member may be cast from bronze but the surface 26 is preferably lined with a lead base babbitt metal. The rounded inner wall 26 is formed with an oil feed opening defined in part by a pair of axially extending edge portions, only one of which, edge 27, is visible in FIG. 1, and the other being shown in FIG. 2. These edge portions 27 and 27' are the terminal parts of the side walls for the lubricant chamber 25. The rounded inner wall 26 includes end portions which extend radially outwardly to provide thrust faces for engagement with the journal. Only one of such faces, face 28, is visible in FIG. 1, but the other thrust face 28' is shown in FIGS. 5 and 6 as engageable with a fillet surface 32 as will be explained. Axially extending grooves are provided in the inner rounded surface 26 and are disposed closely adjacent the edge portions of the oil feed opening. The grooves extend along the axial length of the main bearing 26 and open in the radially extending faces thereof. Only one such groove, groove 29, and the corresponding end opening 31 thereof are visible in FIG. 1. As will be described hereinbelow, the axially extending grooves are adapted to receive a strip of oil-absorbent material, such as felt or the like, for receiving and holding indefinitely copious quantities of lubricant relayed from the reservoir and to be transferred when required to the radially extending thrust faces of the bearing.

Referring now to FIG. 5, the cartridge unit 11 of the embodiment illustrated in FIG. 1, is illustrated as mounted on the journal J of a railway car axle CA and received within a journal box JB. A railroad car wheel W is mounted on the wheel seat WS of the car axle. The journal J is provided with a dust guard seat DS of enlarged diameter as compared to the diameter of the journal J but of less diameter than that of the wheel seat WS. As illustrated in FIG. 5, the dust guard seat DS is disposed intermediate the journal J and the wheel seat WS. A fillet surface 32 smoothly joins the exterior surface of the journal to the exterior surface of the dust guard seat. At its outermost end the journal J has a removable collar C mounted thereon by a lock plate 33 and cap screw 34, but the journal can be machined to have an integral collar. The collar C is of a larger diameter than that of the journal J and hence has an annular surface 35 extending radially outwardly from the outermost axial end of the journal J. The body member 12 of the cartridge unit 11 is mounted on the journal J in a manner such that the main bearing surface 26 contacts the journal J primarily at the uppermost portion of the journal. As is seen with reference to FIG. 5, the main bearing surface 26 is of less axial extent than that of the journal J, and the radially extending thrust faces 28 and 28' are normally spaced from the annular surface 35 of the collar and the fillet surface 32 respectively of the journal. A seal ring 36 is provided between the inner surface of the bearing end collar 19 and the dust guard seat DS of the car axle.

A cover plate 37 is attached to the outermost or forward face of the body member 12 by a plurality of cap screws 38 and includes a vent passage 39, which, as is seen with reference to FIG. 6, connects to a vent passage 41 formed in the body member 12 to vent the interior of the cartridge unit to one of the pockets 15 formed in the upper flat surface 14 of the cartridge unit. The manner in which this venting action is obtained is set out in detail in my application Serial No. 754,211, filed August 8, 1958, now Patent No. 2,948,571. The cover plate 37 also includes a fill plug 42 for adding lubricant to the reservoir 25 of the cartridge unit.

As is seen with reference to FIG. 5, the body member 12 includes a pair of upwardly directed end portions 43 and 44 which provide end walls for the lubricant chamber 25.

There is illustrated in FIG. 5 a member 45 disposed within the reservoir 25 for relaying lubricant from the reservoir 25 to the journal J. Member 45 comprises multiple upwardly extending arms 46 which are adapted to receive lubricant absorbing pads 47 therebetween. Such pads 47 constitute the primary lubricator for effecting lubrication of the arcuate axial face of the bearing, whereas felt strips 58 and 59 are the secondary lubricators for effecting lubrication of the thrust face of the bearing, and this functional relation prevails with the other forms of the invention to be described hereinafter. Thus, the pads 47 serve to relay lubricant from the primary reservoir to the lower surface of the journal. A pair of springs 48 bias the member 45 upwardly from the base of the reservoir 25 to a position wherein the pads 47 contact the lower surface of the journal with the desired degree of pressure. The groove 29, which receives a strip of oil absorbent material for relaying lubricant to the thrust faces 28 and 28' in a manner to be described hereinbelow, is shown in phantom outline in FIG. 5.

Figure 7:
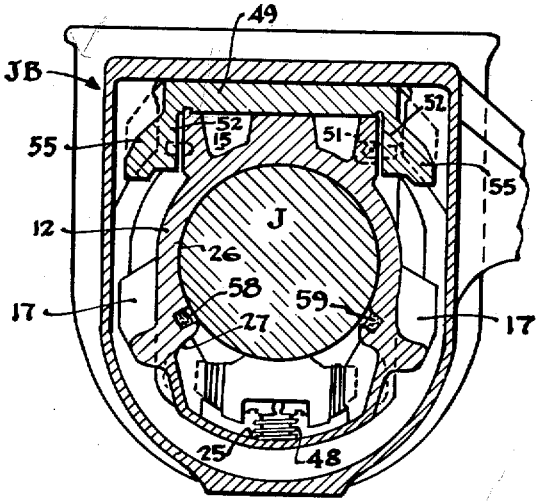
FIG. 7 is a sectional end elevation taken substantially in the direction of the arrows 7—7 in FIG. 5.

A high tensile malleable wear plate 49 is attached to the body member 12 by means of roll pins 51, see FIGS. 6 and 7, which project through apertures formed in depending legs 52 formed at each lateral edge of the wear plate 49. The wear plate 49 includes an upper arcuate-shaped surface 53 shown in FIG. 5, on which the interior surface 54 of the journal box rests. The downwardly depending legs 52 of the wear plate include outwardly projecting legs 55 and 56 which provide thrust members for engagement with a vertically extending stop member 57 which projects inwardly from the side walls of the journal box. It should be noted that the plate 49 eliminates the need for an adapter in the journal box and in narrow pedestal side frames.

As pointed out hereinabove, the rounded inner surface 26, which provides the main bearing surface for the journal, is of less axial extent than that portion of the journal which extends between the annular surface 35 of the collar and the fillet surface 32 of the journal. Thus, in operation the journal is free to move axially within the bearing so that the surface 28 of the body member 12 may engage the annular surface 35 of the collar during some phases of operation, and the radially extending surface 28' of the body member may engage the fillet surface 32 of the journal during other phases of operation. For example, such engagement of the corresponding radial surfaces of the journal and the bearing normally occurs on curved road beds, and it is of the utmost importance that lubricant be supplied to such radial surfaces in copious quantities immediately upon such movement of the journal within the bearing sleeve as would produce such engagement. Such supply of lubricant is necessary to prevent wear of the respective faces and to prevent seizure which might result in a so-called hot-box condition.

Figure 2:
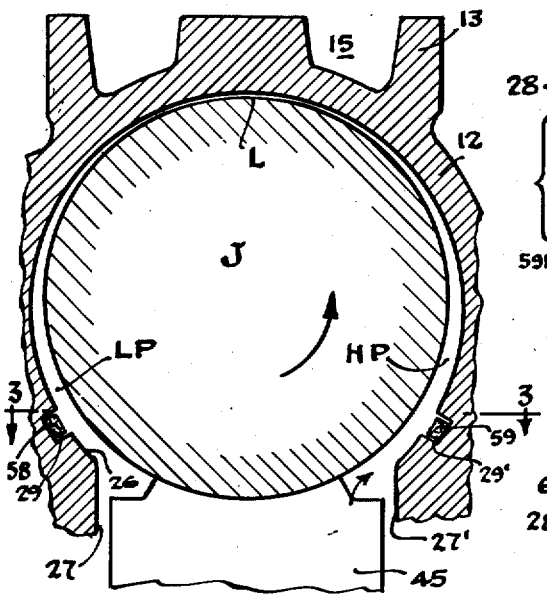
FIG. 2 is a schematic sectional view taken substantially in the direction of the arrows 2—2 in FIG. 1.
Figure 3:
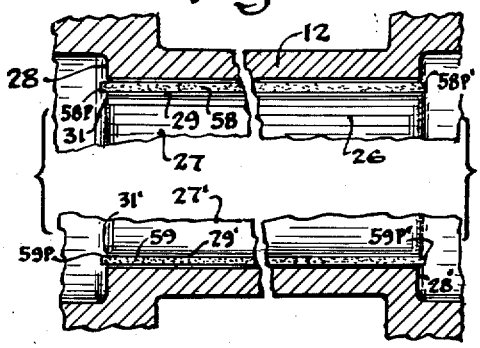
FIG. 3 is in part a schematic sectional view taken in the direction of the arrows 3—3 in FIG. 2.

The manner in which lubricant is supplied to these faces in accordance with this invention will now be described with particular reference to FIGS. 2 and 3. As illustrated in FIGS. 2 and 3, strips of oil absorbent material 58 and 59 are disposed within the grooves 29 and 29′ respectively. Grooves 29 and 29′ and strips 58 and 59 are preferably rectangularly shaped as illustrated. The strips 58 and 59 are wider than the grooves so as to be in effect tightly packed within the grooves. On the other hand, the strips 58 and 59 are of less thickness than the depth of the grooves so as to have their journal-facing surfaces disposed below the bearing surface 26. The strips 58 and 59 are of such length to project beyond the two end openings of both the grooves 29 and 29′ respectively in portions indicated by the reference numerals 58P—58P′ and 59P—59P′ in FIG. 3.

It should be noted in FIG. 3 that the section schematically illustrated provides for communication of the strips with both thrust faces 28 and 28′. Where a bearing has only one thrust face, then the groove as 29 or 29′ will of course communicate therewith, but in such circumstances the groove need not be extended for the full axial length of the arcuate bearing surface.

In FIG. 2, which is somewhat exaggerated in proportions, it will be seen that the journal J has a smaller outside diameter than the internal diameter of the rounded bearing surface 26. In other words, the parts are slightly eccentric. Thus, in bearings of the kind under consideration, the exterior surface of the journal J engages the bearing surface 26 only on an axially extending line indicated by the reference numeral L in FIG. 2, although in practice this may be a small segment area contact, and is referred to as the "loaded zone." In any event, the relationship in actual practice is such that the sides of the journal are slightly spaced from the opposed portions of the bearing surface 26 to define a pair of arcuate wedge-shaped spaces LP and HP therebetween, and these afford secondary oil reservoirs in contrast to the primary oil reservoir in which the primary lubricator is disposed. This relationship of primary and secondary oil reservoirs also prevails with respect to the forms of the present invention to be described hereinafter. Assuming the direction of the rotation of the journal to be counterclockwise as indicated by the arrow in FIG. 2, lubricant is entrained and "drawn" upwardly in the space HP between the journal and bearing surface 26 at the wide lowermost part of such a wedge-shaped space HP. Rotation of the journal thus establishes a considerable degree of pressure sufficient to actually force the lubricant into the strip 59 in a positive manner so that the strip 59 becomes saturated with lubricant. This occurs uniformly along the length of the strip 59, and in fact there is considerable end leakage at the ends of the bearing bore, that is, the lubricant in the space HP is under pressure in all directions of course. Advantage is taken of this in other embodiments of the invention disclosed hereinafter. On the other hand, there will be no lubricant forced into the recess LP, although the strip 58 in the groove 29 may well have been highly saturated with oil in a previous instance of opposite or clockwise rotation of the journal J.

Endwise axial movement of the journal within the body member 12 causes either the fillet surface 32 or the annular collar surface 35 to contact the portion 59P′ or 59P of the strip which projects beyond the end openings as 31′ in the radial thrust face 28′ or 28 of the body member. Such contact of the thrust surface of the journal with the lubricant strip compresses the related end of the strip and squeezes out the oil contained therein. The oil thus squeezed out of the strip 59 effectively lubricates the radial surface 28 or 28′ as the case may be to prevent frictional contact with the corresponding thrust surface of the journal.

In like manner the strip 58 and projecting portions 58P and 58P′ serve to transmit lubricant from the wedge-shaped face to the annular thrust surface 28 or 28′ with the direction of the rotation of the journal opposite to that indicated in FIG. 2.

Figure 4:
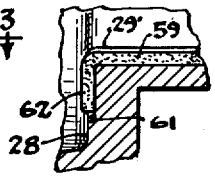
FIG. 4 is a modification of the structure schematically illustrated in FIG. 3.

In those instances wherein the annular thrust surface of the bearing extends for a considerable extent in a radial direction, the structure illustrated in FIG. 4 may be provided to provide an additional amount of lubricant and to distribute such lubricant uniformly over such thrust surface. Thus, in FIG. 4 the thrust surface 28 is provided with a groove 61 which extends radially outwardly in the thrust surface. The strip 59, which is disposed within the groove 29′, includes a right angled end portion 62 which is received within the slot 61 but projects out of the slot beyond the surface 28. This portion 62 serves to supply a greater amount of lubricant to the surface 28 than that which can be supplied by the projecting portions 58P and 59P of the FIG. 3 embodiment. The portion 62 also distributes lubricant more uniformly over the radial extent of the thrust surface 28.

It should be noted that the grooves 29 and 29′ are located in close proximity to the opening in the bearing through which the lubricant is furnished. Such strips do not contact the axial surface of the journal, and the disposition of the strips relative to the opening in the bearing is such that the normal rotation of the journal is effective to force a maximum amount of lubricant into the strips. In this regard the action of the strips 58 and 59 is an important feature of the invention. Tests conducted with such strips removed have resulted in a rapid burn out of the thrust surface of the bearing.

The principle of packing lubricant into an oil absorbent material which, in effect, forms a second reservoir for a radially extending thrust face can also be utilized in sectional bearings of the kind incorporated in axle hung traction motors as described hereinabove. An embodiment of a sectional, sleeve-type bearing which is adapted for use in such applications and which is constructed in accordance with this invention to afford such a lubricant arrangement is illustrated in FIGS. 8–10A and is designated generally by the reference numeral 11–1.

As viewed in FIGS. 8 and 9, the bearing 11–1 comprises two half sections 12–1 and 13–1 which are adapted to mate together to form a sleeve having a cylindrical bore of slightly greater diameter than the diameter of an axle or journal encircled by the bearing sleeve. This involves the principle explained above in connection with FIG. 2. Each of the bearing sections 12–1 and 13–1 includes radially extending flange portions 14–1 and 15–1, respectively, and these flange portions are formed with thrust surfaces 16–1 and 17–1 adapted to engage a complementary thrust surface formed on the axle.

Each of the sections 12–1 and 13–1 is also formed with inner arcuately curved bearing surfaces 18–1 and 19–1 which extend axially along substantially the entire length of the sections.

The section 13–1 is adapted to be positioned on the under side of the axle and is provided with a window opening 21–1 of generally rectangular shape. This window opening enables a primary lubricator to extend through the section 13–1 and engage the under surface of the axle to feed lubricant thereto as has been explained.

In accordance with this invention, the section 13–1 is formed with a plurality of recessed pockets 22–1 in the radially extending thrust face 17–1 and recesses or slots 23–1 in the arcuately curved surface 19–1. As illustrated in FIG. 9, the pockets 22–1 and recesses or slots 23–1 are aligned with one another and may be formed in a convenient manner by a milling operation. The recesses 23–1 and the pockets 22–1 are adapted to mount strips of oil absorbent material therein to afford secondary lubricators for supplying a quantity of lubricant to the thrust face 17–1 in a manner presently to be described. It should be noted that the pockets 22–1 extend radially outwardly to a substantial extent in the thrust face 17–1.

In like manner the bearing half section 12–1 is formed with recesses in the surface 18–1 communicating with pockets in the thrust face 16–1. In FIG. 8 strips 24–1 of an oil-absorbent material are shown mounted within the aforesaid recesses and pockets.

Figure 10:
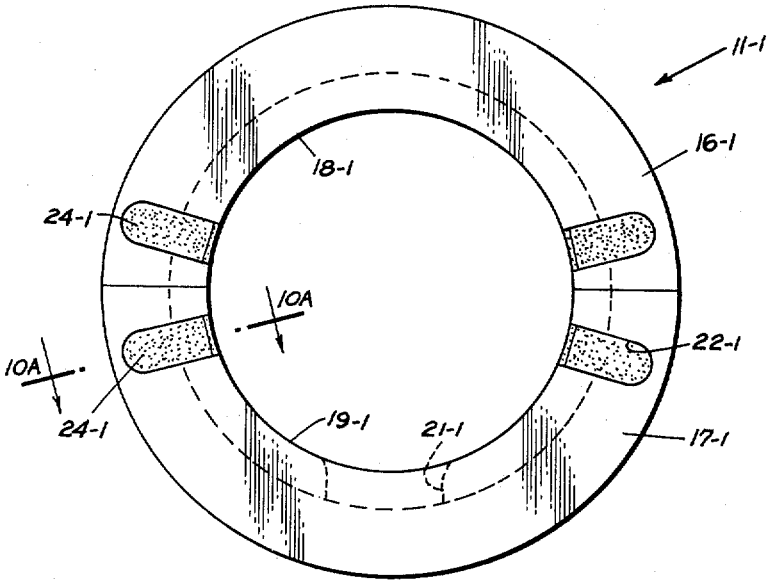
FIG. 10 is an end elevation showing the bearing halves of FIGS. 8 and 9 in assembled or mated form.

With particular reference now to FIGS. 9A, 9B, and 10 it is seen that the depth of each of the recesses 23–1 in the arcuate bearing surfaces 18–1 and 19–1 is somewhat greater than the depth of a pocket 22–1 in the radial thrust surfaces 16–1 and 17–1. This relationship enables a strip of wicking or oil-absorbent material 24–1 to be mounted in a respective slot and pocket in a manner such that the strip 24–1 is at all points disposed beneath the arcuately curved bearing surface but projects a slight amount outwardly from the radial thrust face of each bearing half section. As illustrated in FIG. 9A, the innermost end of each strip 24–1 may extend inwardly beyond the end of the opening 21–1 nearest the flange 15–1. However, this relationship is not critical and the slots 23–1 may be of a somewhat shorter axial length. It is necessary only that the axially extending portion of each strip 24–1 be coextensive with some portion of the axially extending periphery of an axle mounted within the sleeve afforded by the bearing 11–1, as will become apparent from the following description.

Figure 10A:
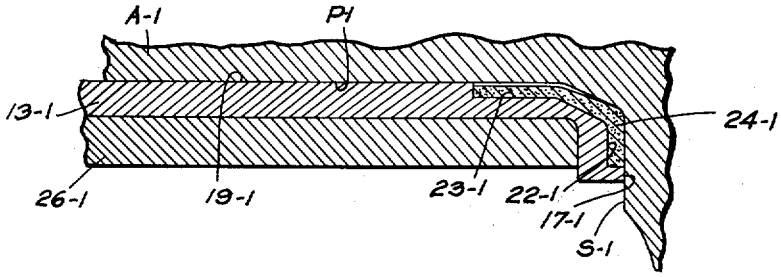
FIG. 10A is a fragmentary sectional view taken on the lines 10A—10A of FIG. 10.

Referring now to FIG. 10A, a portion of the bearing 11–1 is shown in its operative association with an axle A–1. In this instance, the bearing half section 13–1 is illustrated, and an end cap 26–1 positions the section 13–1 so that the arcuately curved surface 19–1 of the bearing extends along the periphery P–1 of the axially extending portion of the axle A–1, while the radial thrust surface 17–1 of the bearing opposes a complementary radially extending surface S–1 of the axle. Rotation of the axle A–1 within the bearing transfers lubricant from a primary lubricator disposed within the window opening 21–1 and around the arcuately curved surfaces of the bearing. Such rotation of the axle establishes pressure in the wedge that results from the eccentricity between the axle and the bearing surface. Lubricant flows axially in this wedge, and the leakage at the end of the wedge (end leakage) is manifest in a forced, unimpeded feed of lubricant into whichever of the strips 24–1 is on the high pressure side of the axle. Thus, it is not necessary that there be a strip as 24–1 continuous from and beyond one end of the bearing bore to and beyond the other end, since end leakage of the lubricant, when the axle is rotating, is available to saturate one or the other of the strips 24–1 that lies adjacent the end of the rotating axle. This principle of saturating the flange lubricating wicks is employed in the embodiments hereinafter described. In this connection it should be pointed out that the grooves as 23–1, and the strips as 24–1 therein, advantageously have their inner ends at least contiguous or in line with the outer end of the window opening as 21–1 for the primary lubricator. In fact, as shown in FIG. 9, these ends in effect overlap to assure that the oil spread on the axle by the primary lubricator in the window opening results in quick end leakage into the flange wicks. Again, this is involved in the constructions hereinafter disclosed.

Normally the respective thrust surfaces 17–1 and S–1 of the bearing and the axle are spaced from one another so as not to be frictionally engaged. In such phases of operation there is, of course, no need to supply a continuous flow of lubricant to the surfaces. However, should the flange and thrust surface S–1 of the axle be moved toward the radial thrust surface 17–1 of the bearing, the flange of the axle acts to compress the projecting radially extending portions of the wicks 24–1 to thereby squeeze out a portion of the lubricant stored therein. Thus, the lubricating arrangement of this invention effectively prevents any seizure between the flange portions of the axle and the bearing by supplying lubricant therebetween during those phases of operation in which said lubricant is required.

While four such lubricating strips have been illustrated, the exact number and relative disposition of the strips can be varied to suit the particular application in which the lubricating arrangement of this invention is embodied. In some instances it may be desirable to include a greater number of strips or to utilize the strips in one section only of the bearing. However, while I am not limited to the particular number and description of lubricating strips as illustrated, it is to be stressed that by having wicks in each bearing half there is assurance that one of the flanges as 16–1 or 17–1 will be effective to lubricate the related thrust face at the end of the axle even though the other flange should be accidentally displaced.

In some applications it has been found desirable to provide for a greater storage capacity in the secondary reservoir afforded by the above described oil-absorbent strips, and an embodiment of this invention which enables such increased storage capacity to be obtained, while utilizing the principles of this invention as above described, will now be described with reference to FIGS. 11–16 of the drawings.

Another form of bearing for an axle hung motor constructed in accordance with this invention and particularly taking advantage of the principle of forcing large quantities of lubricant into a wick or felt strip by end leakage action is indicated in FIG. 11 generally by the reference numeral 11–2. The bearing 11–2 comprises a section 12–2 and a section 13–2 which mate together along their respective laterally extended edges 14–2 and 15–2. Each section includes an axially extending portion formed with an inner-curved surface. Thus, the section 12–2 has an inner bearing surface 16–2, and the section 13–2 has an inner-bearing surface 17–2. As viewed in FIG. 15, the curved inner surfaces 16–2 and 17–2 define a cylindrical bore therebetween, which is adapted to receive the car axle therein.

The bearing section 12–2 includes a radially projecting flange 18–2 which has a thrust face 19–2 formed thereon. In like manner the section 13–2 includes a radially projecting flange 21–2 and a thrust face 22–2. The thrust faces 19–2 and 22–2 are adapted to engage a corresponding bearing surface of a car axle thrust face whenever the axle is moved laterally within the sleeve bearing and into engagement with the thrust faces of the bearing as described hereinabove.

Figure 16:
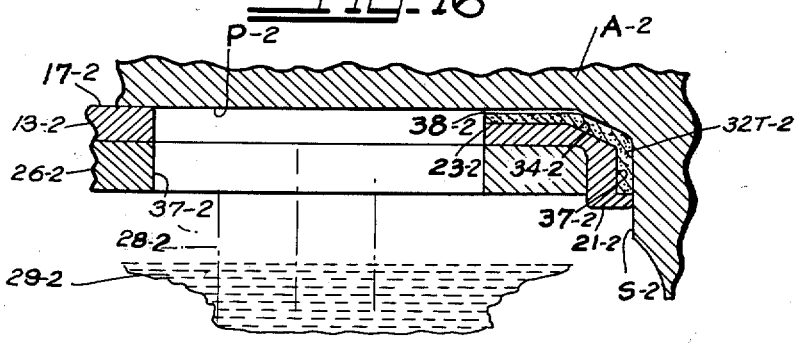
FIG. 16 is a fragmentary elevation showing the bearing of FIG. 15 operatively positioned between an axle cap and a railroad car axle.

With particular reference now to FIGS. 12, 14 and 16, it is seen that the bearing section 13–2 is formed with a window opening 23–2 which extends through the axial portion of the bearing. This window opening is adapted to receive a primary lubricator of any preferred construction such as that described above, which lubricator is operative to transfer lubricant from a reservoir to the periphery of the car axle and to the inner axial surfaces 16–2 and 17–2 of the bearing 11–2.

As best illustrated in FIG. 12, the bearing section 13–2 is formed with recesses 24–2 in each of the laterally extending edges 14–2. The recesses 24–2 are so formed in the edges 14–2 of the bearing section 13–2 as to form keyways with the edges 15–2 of the section 12–2 whenever the two sections are assembled together. Thus, a key member, when inserted therein with the two sections in mating engagement, engages both of the sections to thereby prevent any rotational movement of the bearing within the motor frame or similar bearing mounting structure.

As illustrated in the fragmentary showing in FIG. 16, the bearing sections may be located within a fixed position within the motor mounting frame or similar structure as by an axle cap 26–2. Also, as viewed in FIG. 16, the axle cap 26–2 is formed with a window opening 27–2 which is aligned with the window opening 23–2 in the bearing section 17–2 in a manner such that a wick lubricant device 28–2, as shown in phantom outline in FIG. 16, may project vertically therethrough to transfer lubricant from a reservoir 29–2 to the periphery P–2 of the car axle A–2.

In accordance with this invention each of the bearing sections is so constructed as to enable lubricant to be readily transferred from the area of the window opening 23–2 to the radial thrust faces 19–2 and 22–2 and in copious quantities whenever the radial bearing surface 5–2 of the car axle is moved toward engagement with the thrust faces of the bearing flanges, as in the operative position of these parts as illustrated in FIG. 16.

The specific construction of the bearing sections which enables this desirable result to be obtained will now be described. The end of each bearing section which is adjacent the radial flange is bored out so as to provide an arcuate-shaped groove or recess 31–1 in the bearing section 12–2 and a like arcuate recess 32–2 in the bearing section 13–2. Additionally, the bearing section 12–2 includes a tapered arcuate face 33–2 which extends between the recess 31–2 and the thrust face 19–2 and which is so disposed with respect to these surfaces as to be spaced from that portion of the surface of the car axle which extends between the periphery P–2 and the bearing surface S–2, see FIG. 16. In like manner, the bearing section 14–2 includes a tapered surface 34–2 which extends between the recess 32–2 and the thrust face 22–2.

The thrust face 19–2 of the bearing section 12–2 is milled to have a plurality of recessed pockets or slots 36–2, three in number and equidistant as illustrated, and the thrust face 22–2 of the bearing section 13–2 is likewise formed with similar pockets 37–2. The arcuate-shaped recesses 31–2 and 32–2 form a continuous annulus with the two sections in assembled relation, and this annulus is effective to serve as a reservoir chamber for distributing lubricant to the slots 36–2 and 37–2 in the thrust faces 19–2 and 22–2 in a manner presently to be described. It should be noted that the recess 32–2 in the bearing section 13–2 extends axially inwardly to an edge of the window opening 23–2, as viewed in FIGS. 12 and 14, and thus the window opening 23–2, in effect, communicates with the slots 36–2 and 37–2 in the bearing thrust faces.

Wick means, additional to the wick-type lubricant device 28–2, in a form of a felt or similar porous, oil absorbent material are mounted within one or both of the recesses 31–2 and 32–2 of the two bearing sections for facilitating the above mentioned storage of lubricant within the recesses 31–2 and 32–2 and the distribution of the lubricant to the pockets 36–2 and 37–2. As viewed in FIGS. 12 and 13, a wick 38–2 in a form of a half ring is disposed within the recess 32–2 of the bearing section 13–2. As shown in FIGS. 12 and 16, the inner end of the wick 38–2 and its groove are contiguous with the outer end or edge of the window opening 23–2 with the advantage referred to above.

Figure 15:
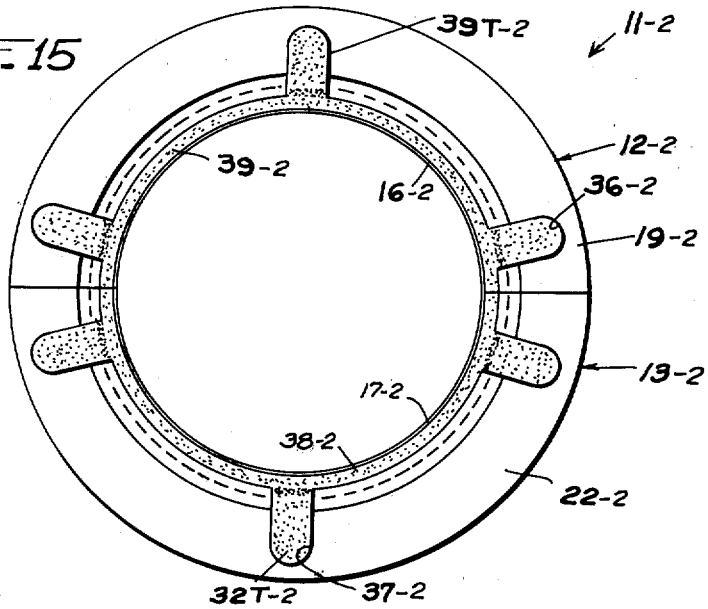
FIG. 15 is an end elevation view showing the two half sections illustrated in FIGS. 11 and 12 in their assembled relation.

The wick 32–2 is formed with tab portions 32T–2 which overlie the tapered surface 34–2 so as to have their ends disposed within the pockets 37–2. As best viewed in FIG. 13 the depth of the pockets 37–2 and the width of the wick tab portions 32T–2 are such that the tab portions project slightly outwardly beyond the thrust face 22–2. Similarly, and as illustrated in FIG. 15, a wick 39–2 may be mounted within the recess 31–2 of the bearing section 12–2 so as to have tab portions 39T–2 project slightly outwardly from the pockets 36–2 in the thrust face 19–2. Also, as illustrated in FIG. 15, the wicks 38–2 and 39–2 are at all points disposed beneath the axial bearing surfaces 16–2 and 17–2 and thus do not directly contact the periphery D–2 of the axle. The wicks 38–2 and 39–2 are preferably glued to the respective bearing sections by an epoxy resin. The inner edge of the recess or groove 31–2 and that of the related strip 39–2 are in line with the outer edge of the opening 23–2 when the parts are assembled.

In the operation of the apparatus illustrated in FIGS. 11 to 16, the rotating axle A–2 as in the foregoing embodiments carries a band of oil circumferentially about the bearing, as supplied by the main or primary wick lubricator 28–2. This band is spread quite thin at the load area or zone of the bearing wherein the band of oil is reduced to film thickness by the load imposed on the bearing. The wick means 38–2 and 39–2 absorb the lubricant forced thereinto and retain a copious amount of lubricant within the ring-like portion of the wicks mounted within the annulus defined by the recesses 31–2 and 32–2. Normally, the bearing surface S–2 of the car axle is slightly spaced from the thrust faces 19–2 and 22–2 of the flange portions of the sectional bearing so that normally there is, at the most, only a light engagement between the tabs 38T–2 and 39T–2 and the radial bearing surface S–2. However, upon such movement of the axle A–2 within the sleeve bearing 11–2 as would produce engagement between the thrust faces of the axle and the bearing flanges, the face S–2 compresses the tabs 32T–2 and 39T–2 of the oil impregnated wicks within the pockets 36–2 and 37–2 and thereby squeezes some of the lubricant from the wicks prior to any engagement of the thrust faces of the axle collar and the bearing flanges. The lubricant thus squeezed from the tabs 32T–2 and 39T–2 is rapidly dispersed about the complementary thrust faces of the bearing 11–2 and the thrust face S–2 of the axle of the relative rotation of these two members. Thus, the construction of the flanged-end portion of the bearing 11–2 together with the oil-absorbent wick means enable an adequate supply of lubricant to be maintained in a manner such that the lubricant can be transferred to the thrust faces in copious quantities at the exact moments that such lubrication is required. Also, by reason by the continuous band configuration of each of the strips 38–2 and 39–2 and the three equally spaced tab portions on each strip, an adequate supply of lubricant is insured for whatever portion of the flange may be subjected to the shifting load imposed on the bearing.

While the sectional bearing of this invention has been illustrated in FIG. 15 as incorporating wick means in each of the bearing sections, with the advantage mentioned above, it is not essential that both bearing sections be so provided with the wick means. Instead, in some applications, it may be desirable to reduce the amount of lubricant transmitted from the inner, axial portion of the bearing to the radial thrust faces by applying the oil absorbent wick in one of the bearing sections only.

Figure 17:
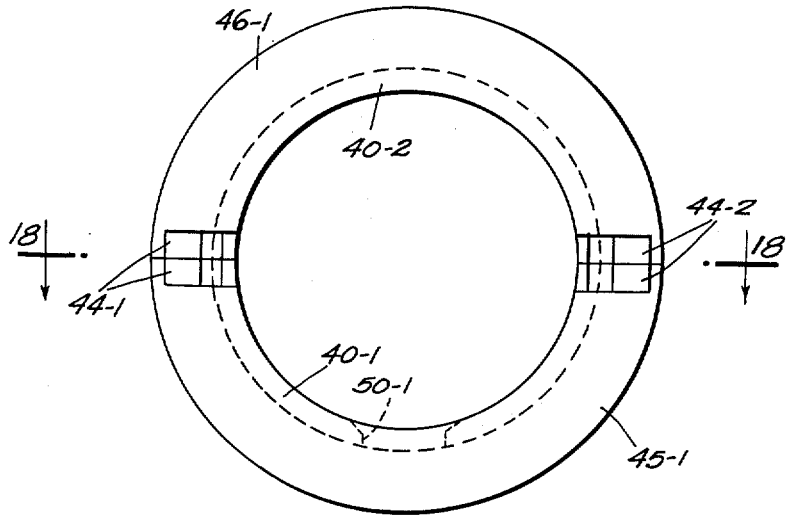
FIG. 17 is a flange end view of assembled split bearing halves showing another embodiment of the present invention.

The modification illustrated in FIGS. 17 and 18 is again one specifically adapted to be used in association with the axle of a so-called hung motor. The modification in this instance is much less expensive to produce in comparison to the flanged, split sleeve bearing modifications above described inasmuch as each bearing half 40–1 and 40–2, FIG. 17, is so constructed as to have identical grooves or elongated recesses 41–1 and 41–2 located at what constitutes the mating faces or surfaces 42–1 and 43–1. Thus, as in the foregoing embodiments, split halves of the assembled bearing are, as shown in FIG. 17, assembled so that the flat longitudinal faces thereof are in flush engagement along the axial or longitudinal portions as well as the radial mating surfaces of the flanges. The parts are secured together by a key or the like in a keyway KW, FIG. 18, as in the instance of conventional split bearings. It is a relatively simple machining operation to mill the grooves as 41–1 and 41–2 and the related flange pockets or recesses 44–1 and 44–2 that extend radially outwardly in the related half flanges 45–1 and 46–1. Thus, the grooves in effect are continuous from the arcuate bearing surface of each bearing half outward to the radial portions 44–1 and 44–2 in the thrust face of each flange of each bearing half. Each such continuous groove as 41–1 and the related flange pocket as 44–1 are located at what can be viewed the 0° and 180° positions of the related bearing half, and the groove is L-shaped in cross-section since it extends to and opens at the mating surface as well as the arcuate bearing surface of each bearing half, in contrast to the above described modifications wherein the grooves and related pockets are somewhere in-between these positions where machining is somewhat more expensive.

Figure 18:
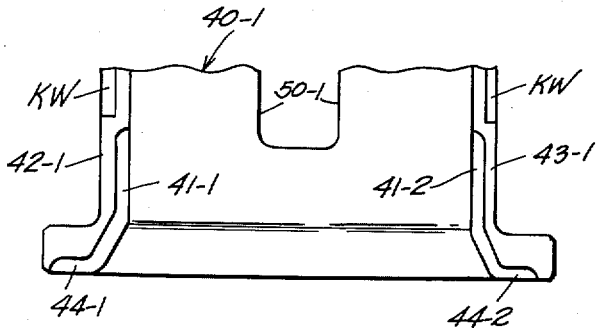
FIG. 18 is a fragmentary elevation of one of the bearing halves shown in FIG. 17 and taken on the line 18—18 of FIG. 17.

One of the split sleeves, 40–1, is formed with a window opening 50–1 in which the primary or main lubricator is to be disposed to relay oil directly to the rotating journal or axle, and as will be evident in FIG. 18, the inner ends E of the grooves 41–1 and 41–2 in effect overlap the outer end E′ of the window opening 50–1, which is to say that the oil absorbent material pressed into the grooves 41–1 and 41–2 and extending continuously to the related pockets 44–1 and 44–2 to project beyond the thrust surface of the bearing will receive oil quickly from the rotating axle in accordance with the principle discussed above in connection with FIG. 2. Of course, the wick strips pressed in the grooves will have inner or journal facing sides disposed wholly below the arcuate bearing surface so as to be free of contact with the journal portion of the axle as in the foregoing embodiments. In the event that there should be relative slippage between the sleeves 40–1 and 40–2, such that one sleeve is displaced axially of the other, there will nevertheless be two wick-filled pockets in the correctly positioned bearing half available for furnishing lubricant to the opposed thrust face of the axle or journal in the event that the opposed thrust faces should engage during operation. On the other hand, during normal operation, the end portions of the wicks in the flange pockets in effect afford a relatively wide pad, each at the parting line of the mating zone and displaced 180° from one another.

Broadly speaking, it is not new to provide a wick strip in a bearing that is to receive lubricant, and having an end extended to a flanged portion of the bearing so that lubricant is available in the event that the opposed thrust surface of the rotating element engages the flange of the bearing. An arrangement thus broadly considered is disclosed in my Patent No. 2,827,343 mentioned above. However, in that patent the wick strip includes a tail portion shown in FIG. 6 of the patent which dips into the main oil reservoir through a window opening in which the main lubricator is effective to relay lubricant to the axle. Experience has shown that sometimes there is interference between the tail portion of the wick strip and the main lubricator, and of course this problem is not encountered in accordance with the present invention. The wick strip in my aforesaid patent is pushed through a restricted passage in the main body of the bearing, and an end portion of the strip opposite the aforesaid tail end is disposed in a recessed pocket at the flange end of one of the bearing halves. However, I have found that having the strip disposed in a restricted passageway of the aforesaid kind tends to impede rapid flow of lubricant by capillarity in the main reservoir to the end of the wick that is in the flange pocket. Thus, where I previously relied upon capillary flow, I am now relying upon an actual pressure head under the present invention as explained above in connection with FIG. 2 of the present invention, and in this connection it will be recognized that the groove or recess under the present invention, which is in the axial portion of the bearing, opens in its entire extent into the arcuate surface or bore of the bearing so that there is an unimpeded and direct flow of oil under pressure into the wick. This does not occur in accordance with the construction of my aforesaid patent, and in fact end leakage or end pressure flow of lubricant into the flange lubricating strip of my aforesaid patent is restricted and the full force does not come into play because the only chance of end leakage oil gaining access to the flanged lubricating strip is through the opening 38 of my aforesaid patent, and even in this instance I have found that in actual operation silt eventually tends to block the opening identified as 38 in my aforesaid patent.

It has been proposed in Austrian Patent No. 104,244 to have a narrow strip of wicking material running longitudinally of an arcuate bearing surface. However, the strip is purposely of such thickness as to have an inner face engaged by the arcuate surface of the rotating axle or the like such that oil tends to be wiped off the axle or other rotating part, causing the bearing to run hot, and I have found by actual test that if the felt strip, contrary to the present invention, projects far enough into the bore of the bearing to contact the journal or axle, little or none of the oil is wicked to the ends of the felt or strip so as to be available for thrust lubrication. Without any wick in a groove in accordance with the present invention, the oil merely drains out due to the pressures causing end leakage, and if the end of the wick is not extended all the way to the thrust face to engage the opposed part, it is not possible to take advantage of the principle of end leakage to lubricate the thrust faces when they engage. Thus, in the Austrian patent, the primary intention of the strip referred to is that this strip act as an impedance to the flow of oil out of the groove in which it is disposed, and there is no mention of thrust face lubrication in the Austrian patent.

While the invention has been described with relation to one-piece cartridge bearings for a railway car journal and bearings for axle hung motors, it is apparent that it is applicable to a segment bearing or other bearing.

Thus in accordance with this invention there is provided a lubricating unit for a radial thrust face of a bearing member having an axially extending rounded inner main bearing surface. A strip of oil absorbent material is retained in a groove or recess formed in the main arcuate bearing surface, and this groove is of appreciable axial extent so that the strip therein will receive oil supplied to the rotating part by the primary lubricator under the principle explained above. The strip is free of contact with the journal portion of the rotating part and when pressure builds up in the bearing due to the rotating part being of less radius than that of the arcuate bearing surface, lubricant is resultantly forced from one of the wedge spaces into a wick strip. The strip in effect is extended slightly beyond the radial thrust surface of the bearing. The groove and strip can be of extensive length as in FIGS. 1 to 7 and located closely adjacent the area at which lubricant is supplied to the main bearing surface, and the strip or secondary lubricator in each instance is adapted to receive and store lubricant which is passed thereto during normal operation of the bearing. The projecting portion of this strip is effective to transfer such lubricant to the radial thrust face in sufficient quantities to insure effective lubrication at such times as the inner rotating element in the bearing shifts within the bearing to cause a surface thereof to compress the projecting end portion of the strip and squeeze lubricant therefrom, and it will be recognized that the eccentricity between the bearing and the rotating part establishes what can be viewed as a secondary oil reservoir as particularly shown and described in connection with FIG. 2 which assures copious quantities of oil in the secondary felt strips.

Also, in accordance with this invention, there are afforded arrangements which enable the radial thrust face of a flanged sleeve bearing of an axle hung motor or the like to be supplied with an adequate supply of lubricant at such times as the thrust face may be engaged with a complementary thrust face of some additional structure. The lubricating arrangement in this instance may be easily and economically incorporated in existing and conventional flanged sleeve bearings with a minimum of modification to such bearings, yet is quite effective in operation, particularly by forming the grooves at the mating surfaces of the bearing halves thereby holding machining costs to a minimum. In any event, the groove which receives the wick is wholly open to the bore of the bearing and extends uninterruptedly therefrom to and slightly beyond the thrust face of the bearing, so that the full force and effect of end leakage, due to the pressure build up on lubricant in the bearing bore caused by the rotating part, is brought to bear on the wick in the bore.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a cartridge bearing for a journal, a body member in the form of a one-piece sleeve having a lower section including radially inwardly directed end portions affording a chamber for lubricant to be relayed to the journal, said body member having a rounded inner wall providing the main bearing surface for said journal and terminating in axially extending edge portions defining a lubricant feed opening above said lubricant chamber, said rounded inner wall being of less axial extent than the sleeve and having an end portion extending radially outwardly to provide a thrust face for engagement with a radial thrust face of the journal, said rounded inner wall having an axially extended groove therein disposed closely adjacent one of said edge portions and opening in said radial thrust face, and an oil absorbent material disposed within the groove wholly below the level of the rounded bearing surface and projecting beyond the opening in the thrust face for receiving lubricant relayed from the lubricant chamber and transmitting such lubricant to the radial thrust face upon engagement of the projecting portion of the oil absorbent material with the journal.

2. In a cartridge bearing for a journal, a body member in the form of a one-piece sleeve having a lower section including radially inwardly directed end portions affording a chamber for lubricant to be relayed to the journal, said body member having a rounded inner wall providing the main bearing surface for said journal and terminating in axially extending edge portions defining a lubricant feed opening above said lubricant chamber, said rounded inner wall being of less axial extent than the sleeve and having an end portion extending radially outwardly to provide a thrust face for engagement with a radial thrust face of the journal, said rounded inner wall having an axially extending groove therein disposed closely adjacent one of said edge portions and opening in said radial thrust face, an oil absorbent material disposed within the groove wholly below the rounded bearing surface and projecting beyond the opening in the thrust face for receiving lubricant relayed from the lubricant chamber and transmitting such lubricant to the radial thrust face upon engagement of the projecting portion of the oil absorbent material with the journal, and said body member being formed with an annular ring at one end thereof, the inner circumference of which ring provides a shroud for a sealing ring.

3. In a cartridge bearing for a journal, a body member in the form of a one-piece sleeve having a lower section including radially inwardly directed end portions in the lower section thereof affording a chamber for lubricant to be relayed to the journal, said body member having a rounded inner wall providing the main bearing surface for said journal and terminating in axially extending edge portions defining a lubricant feed opening above said lubricant chamber, said rounded inner wall being of less axial extent than the sleeve and having an end portion extending radially outwardly to provide a thrust face for engagement with a radial thrust face of the journal, said rounded inner wall having an axially extending groove therein disposed closely adjacent one of said edge portions and opening in said radial thrust face, an oil absorbent material disposed within the groove wholly below the rounded bearing surface and projecting beyond the opening in the thrust face for receiving lubricant relayed from the lubricant chamber and transmitting such lubricant to the radial thrust face upon engagement of the projecting portion of the oil absorbent material with the journal, said body member having a flat upper surface providing a seating surface, a wear plate seated on said seating surface and attached to said body member, and said wear plate having an arcuate shaped upper surface and depending legs formed with projecting lugs for mounting said bearing in a railway car journal box.

4. In a bearing unit, a first axially extending member affording an inner curved bearing surface and having an outwardly directed end portion affording a radially outwardly extending thrust bearing, a second member rotatable within said first member and having a smaller radius than that of the curved bearing surface so that the first and second members engage only along a restricted axially extending loaded zone and define a pair of substantially wedge-shaped spaces between the non-contacting portions of said members on opposite sides of said zone, said second member having a collar member at one end providing a radial extending bearing surface engageable with the thrust bearing surface of said first member, the first member having groove means formed in the curved bearing surface which open into the curved bearing surface for substantially the full length of the groove means, said groove means opening into the thrust bearing surface of the first member, an oil absorbent material disposed within the groove means wholly below the curved bearing surface so as to be free of contact with the portion of the second member that rotates in said inner curved bearing surface, said oil absorbent material extending beyond the opening in the radial thrust bearing surface, and means for supplying lubricant such as oil or the like to the inner bearing surface whereby rotation of the second member within said first member forces lubricant into said absorbent material and engagement of said radial thrust faces squeezes lubricant from the portion of the absorbent material extending beyond the opening in the radial thrust face of said first member.

5. In a bearing unit, a first axially extending member affording an arcuate bearing bore and having an outwardly directed end portion affording a radially outwardly extending thrust bearing surface, a second member rotatable within said first member and having a smaller radius of curvature than that of the bearing bore so that the first and second members engage only along an axially extending loaded zone and define a pair of wedge-shaped spaces between the non-contacting portions of said members on opposite sides of said zone, said second member having an enlarged end portion providing a radial extending bearing surface engageable with the radial thrust bearing surface of said first member, the bearing bore being interrupted by edge portions defining an opening for a lubricator therebetween and having axially extending groove means on opposite sides of said opening, said groove means opening into the bearing bore for the full length of the groove means, said thrust bearing surface having recessed pockets formed therein which communicate with said groove means, absorbent material disposed within the groove means wholly below the bearing surface of the bearing bore so as to be free of contact with the portion of the second member that rotates in said bore, said absorbent material being extended to said pockets and projecting from the pockets in the radial thrust bearing surface, and lubricator means for supplying lubricant through said opening to the second member whereby rotation of the second member within said first member forces lubricant into said absorbent material and engagement of said radial thrust faces squeezes lubricant from the portion of the absorbent material projecting beyond the pockets in the radial thrust face of said first member.

6. A sectional bearing for use with an axle of predetermined diameter and of the type having a radially projecting thrust face and comprising in the form of split bearing halves separate mating sections, each having axially extending mating faces along which the bearing halves are engageable, said bearing halves being formed with inner, curved surfaces defining a cylindrical bore therebetween of larger diameter than the axle, which bore is adapted to receive the axle therein, each of said sections having a radially projecting thrust face at one end thereof, which thrust face is adapted to engage the thrust face of said axle, one of said sections having an opening extending through an axial portion thereof enabling lubricant to be supplied to the cylindrical bore, each of said sections having a pair of recesses formed in the inner curved surface thereof respectively adjacent each axially extending mating face thereof and which opens at the thrust face thereof, said recesses for the full length thereof opening into said bore, and oil absorbent material disposed in and restricted to said recesses except for an end thereof projecting slightly beyond the thrust face of the related bearing section, said absorbent material in each recess only partially filling each recess so as to be free of contact with the portion of the axle which rotates in said bore, whereby the axle when rotating is effective to force lubricant supplied thereto into the oil absorbent material at least in the recesses at the high pressure side of the rotating axle, said oil absorbent material thereby storing lubricant and becoming a reservoir for lubricant to be applied to and available at the thrust face of the bearing.

7. A bearing according to claim 6 wherein the recesses are located immediately adjacent and extend to the mating faces.

*8. A sectional bearing for use with an axle of predetermined diameter and of the type having a radially projecting thrust face and comprising in the form of split bearing halves separate mating sections, each having axially extending mating faces along which the bearing halves are engageable, said bearing halves being formed with inner, curved surfaces defining a cylindrical load bearing bore therebetween of larger diameter than the axle, which bore is adapted to receive the axle therein, each of said sections having a radially projecting thrust face at one end thereof, which thrust face is adapted to engage the thrust face of said axle, one of said sections having an opening extending through an axial portion thereof enabling lubricant to be supplied to the cylindrical bore, each of said sections having a pair of recesses formed in the inner curved surface thereof respectively adjacent each axially extending mating face thereof and which opens at the thrust face thereof, said recesses communicating with said bore, and oil absorbent material disposed in and restricted to said recesses except for an end thereof projecting slightly beyond the thrust face of the related bearing section, said absorbent material disposed in each recess wholly below the curved surfaces defining said load bearing bore so as to be free of wiping contact with the portion of the axle which rotates in said bore, whereby the axle when rotating is effective to force lubricant supplied thereto into the oil absorbent material at least in the recesses at the high pressure side of the rotating axle, said oil absorbent material thereby storing lubricant and becoming a reservoir for lubricant to be applied to and available at the thrust face of the bearing.*

References Cited in the file of this patent or the original patent

UNITED STATES PATENTS 2,827,343 Cox ---------- Mar. 18, 1958

FOREIGN PATENTS 104,244 Austria ---------- Jan. 25, 1927